United States Patent
Curey et al.

(10) Patent No.: US 6,687,645 B2
(45) Date of Patent: Feb. 3, 2004

(54) MOTION AND TRAJECTORY DATA GENERATOR FOR A MULTI-GIMBALED ROTATING PLATFORM

(75) Inventors: Randall K. Curey, Winnetka, CA (US); Daniel A. Tazarles, West Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 139 days.

(21) Appl. No.: 09/894,489

(22) Filed: Jun. 28, 2001

(65) Prior Publication Data

US 2003/0014211 A1 Jan. 16, 2003

(51) Int. Cl.$^7$ .................. G01C 17/00; G01C 19/00; F16M 11/14
(52) U.S. Cl. .................. 702/150; 702/151; 248/182.1; 73/504.03
(58) Field of Search ................ 702/150, 151, 702/187, 149; 248/182.1, 183.1, 184.1, 183.2, 185.1; 73/504.03, 504.02

(56) References Cited

U.S. PATENT DOCUMENTS

| | | | |
|---|---|---|---|
| 3,587,330 A | | 6/1971 | Deer |
| 5,353,242 A | * | 10/1994 | Crosbie et al. ........... 703/8 |
| 5,672,866 A | * | 9/1997 | Messina ............... 250/236 |
| 5,798,863 A | * | 8/1998 | Udagawa et al. ....... 359/557 |
| 2002/0033434 A1 | | 3/2002 | Furuta |

FOREIGN PATENT DOCUMENTS

| | | |
|---|---|---|
| DE | 2029595 | 12/1971 |
| EP | 0 253 615 | 1/1988 |

* cited by examiner

Primary Examiner—John Barlow
Assistant Examiner—Meagan S Walling

(57) ABSTRACT

A system and method for generating motion and trajectory data for a multi-gimbaled rotating platform. The system includes a motion generating unit for generating a set of motion equations for each degree of rotational freedom of the multi-gimbaled rotating platform, where each set of motion equations defines the rotational movement of the platform about a gimbal pivot axis between a starting position and an ending position. The movement characteristics of the gimbals are provided to the motion generating unit for generating a set of motion equations which define the movement of the gimbals between the starting position and the ending position of the rotating platform. The set of motion equations simulating movement of the rotating platform may be further utilized to generate trajectory data for the object being supported by the platform, so that the effect of the motion of the rotating platform on the object can be simulated without requiring the rotating platform to be actually moved in a field test.

76 Claims, 6 Drawing Sheets

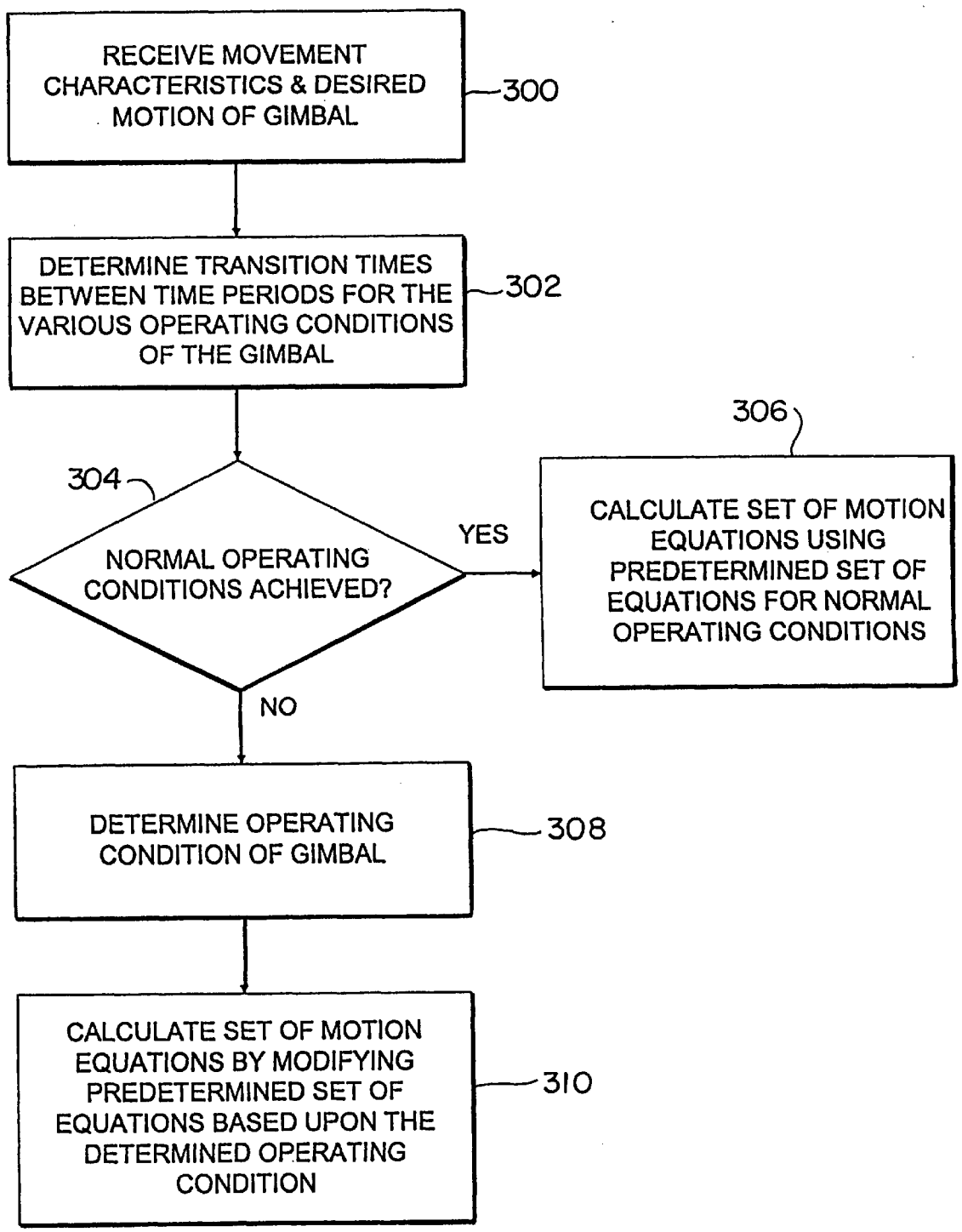

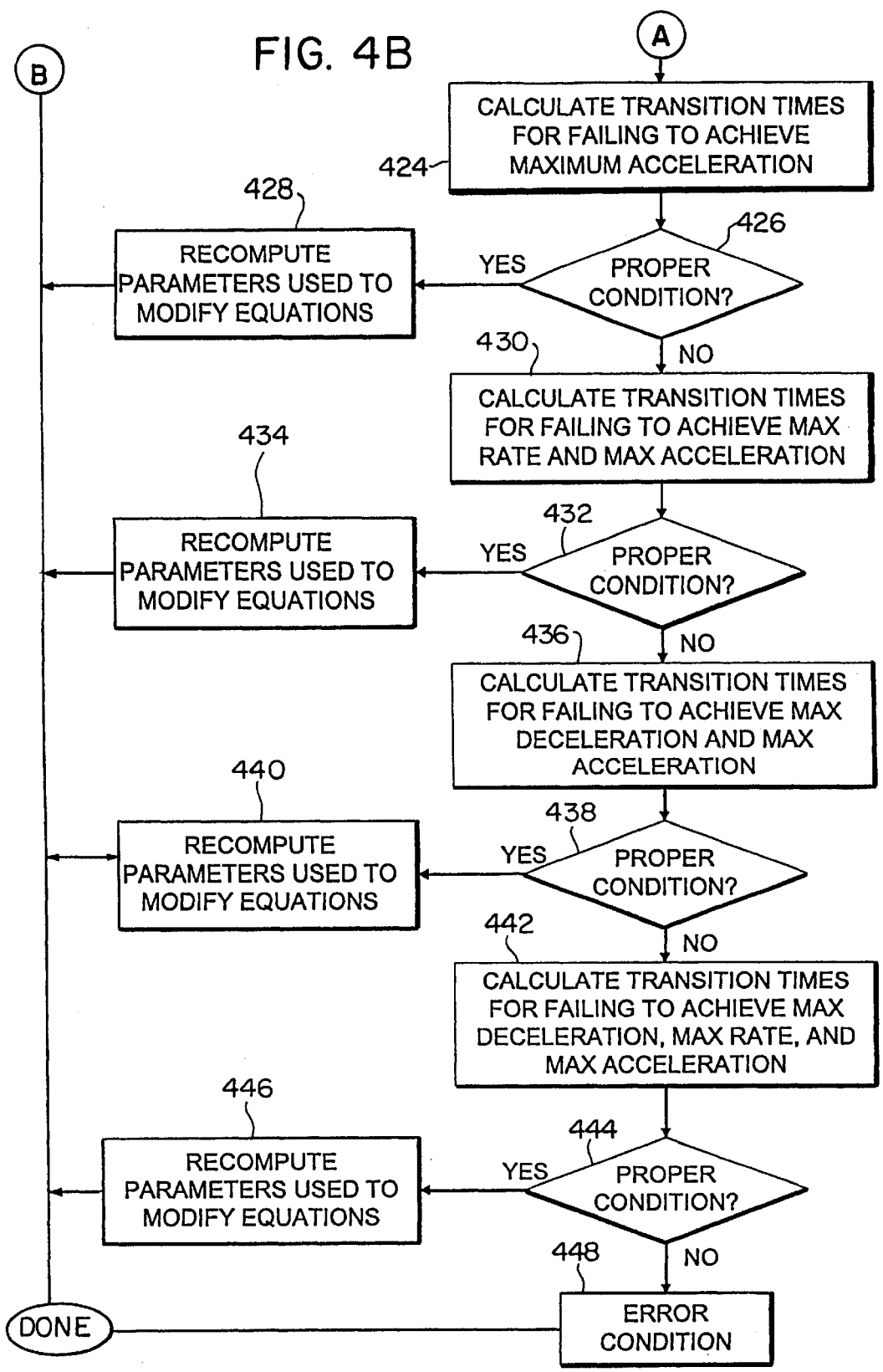

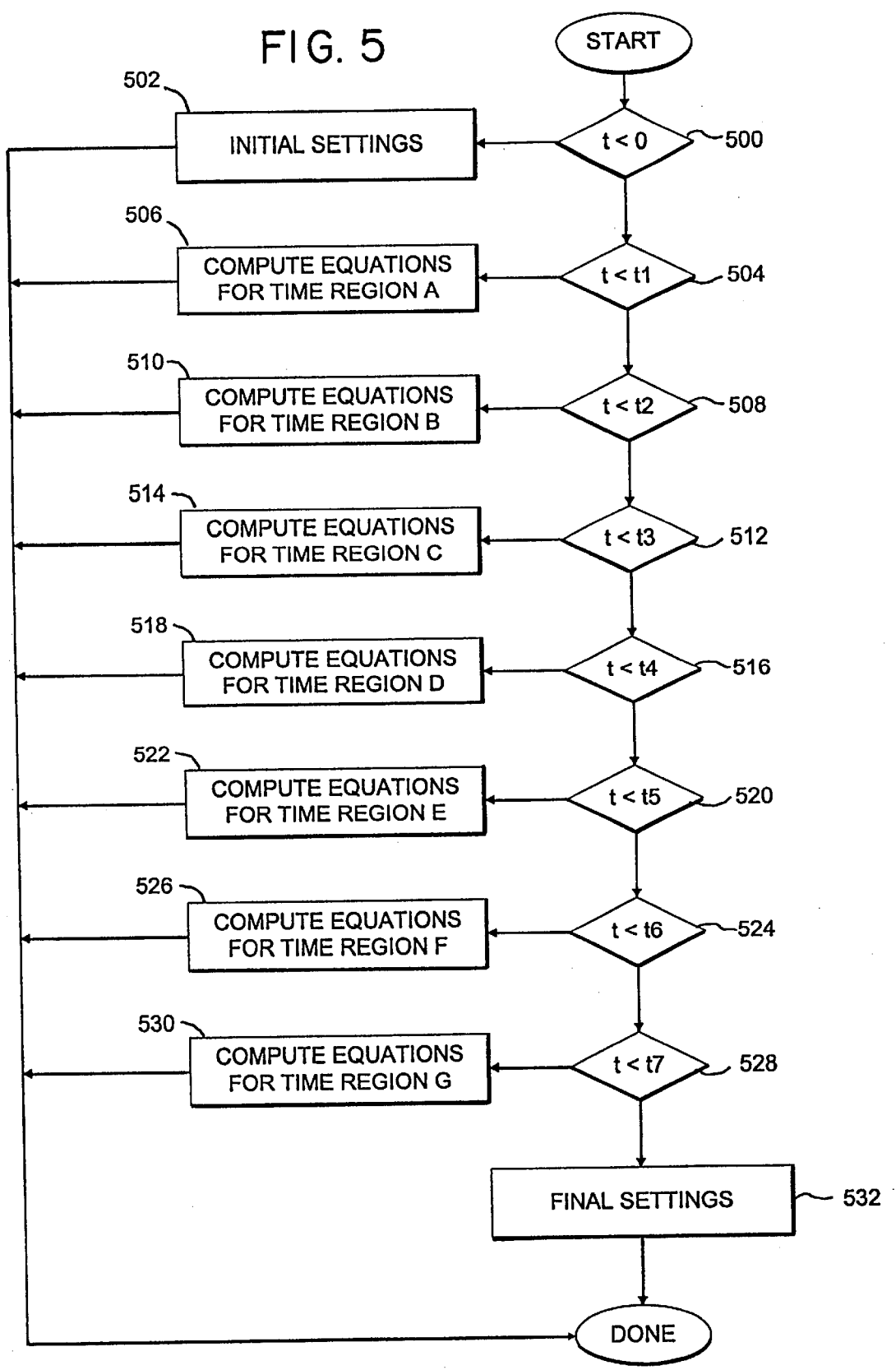

MOTION AND TRAJECTORY DATA GENERATOR FOR A MULTI-GIMBALED ROTATING PLATFORM

BACKGROUND OF THE INVENTION

1. Field of the Invention

This invention relates to a motion and trajectory data generator for a platform having multiple degrees of rotational freedom, and more specifically pertains to a motion and trajectory data generator for a multi-gimbaled rotating platform supporting a projectile having an inertial navigation system.

2. Description of Related Art

There have been recent developments directed toward equipping projectiles with an inertial navigation system. In these applications, the inertial navigation system (INS) is incorporated into the projectile in order to guide the projectile to a desired target location. It is common for such guided projectiles to be launched from a launcher platform having several degrees of rotational freedom in order to position the projectile to a desired launch position.

In order to evaluate the performance of a guided projectile without having to field test the guided projectile through an actual launch, simulated launches are often performed using pertinent data related to the launches. Information obtained from a simulated launch can be utilized to align and calibrate the INS of the guided projectile. Furthermore, the movement of the launcher platform can be used to align and calibrate the INS in the guided projectile with respect to Earth. Unfortunately, existing motion and trajectory simulators are only designed to simulate the trajectory of the guided projectile through its flight path, where such existing motion and trajectory simulators do not deal with the types of motion encountered on a typical launcher platform. For instance, when a launch is initiated for the projectile, the launch platform must reposition from its current location to its desired launch position. There is currently no way of simulating the motion of the launch platform or the effect of its motion on the launch without actually moving the launch platform in a field test.

Furthermore, in current simulators, rotation rates are generated by coordinated turns which do not address the situations of multi-gimbaled coupled rotations, as experienced by most launch platforms. Generating realistic motions such as those experienced by a multi-gimbaled launch platform is not possible using conventional simulators as rotations must be generated about constrained degrees of freedom. Additionally, the starting and stopping characteristics of the motion of the launch platform must be taken into account in order to simulate realistic inertial data which would be sensed by an INS in the projectile carried on the launch platform. Conventional simulators fail to account for these starting and stopping inertial characteristics.

Thus, there is clearly a need for a motion and trajectory data generator for providing simulated data for the movement of a launch platform carrying a projectile to be launched to permit evaluation of the projectile launch without actual field testing. Moreover, there is a need for a motion and trajectory data generator for providing simulated data for a multi-gimbaled rotating launch platform.

SUMMARY OF THE INVENTION

The present invention provides a system and method for generating motion and trajectory data for a multi-gimbaled rotating platform. A motion generating unit is provided for generating a set of motion equations for each degree of rotational freedom of the multi-gimbaled rotating platform, where the set of motion equations define the rotational movement of the platform about the pivot point of the gimbals between their starting position and ending position. Movement characteristics of the gimbals are provided to the motion generating unit for computing the set of motion equations, where the movement characteristics include a maximum angular acceleration, a maximum angular deceleration, a maximum angular rate, and a step angular jerk of the gimbal. Furthermore, the starting and ending positions of the gimbal are also provided to the motion generating unit. From these values, the motion generating unit generates a set of motion equations which define the movement of the gimbal between its starting position and its ending position during rotation of the platform. The set of motion equations define an angular acceleration, an angular rate, an angular displacement, and an angular jerk for each gimbal.

Once the set of motion equations for each gimbal of the multi-gimbal rotating platform are generated, it is possible to utilize these gimbal motion equations to compute trajectory data for an object being supported by the platform. The present invention utilizes the set of motion equations simulating movement of the rotating platform to generate trajectory data for the object with respect to Earth, so that the effect of the motion of the rotating platform on the object can be simulated without requiring the rotating platform to be actually moved in a field test. An attitude/position processing unit generates a second set of motion equations which define the movement of the object being supported by the rotating platform, wherein said second set of motion equations include a relative acceleration, velocity, and position experienced by the object on the platform as well as attitude information and a relative body rate of the object.

BRIEF DESCRIPTION OF THE DRAWINGS

The exact nature of this invention, as well as its objects and advantages, will be readily appreciated upon reference to the following detailed description when considered in conjunction with the accompanying drawings, in which like reference numerals designate like parts throughout the figures thereof, and wherein:

FIG. 3 is an operational block diagram of a preferred method in which the motion generating unit generates a set of motion equations in accordance with the present invention;

FIGS. 4A and 4B are operational block diagrams illustrating a more detailed aspect of the method of FIG. 3 in which the motion generating unit determines the transition times between time periods and determines the actual operating condition of the gimbal; and FIG. 5 is an operational block diagram of the manner in which the motion generating unit generates the set of motion equations for the various time periods determined in FIGS. 4A and 4B in accordance with a preferred method of the present invention.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a motion and trajectory data generator for a multi-gimbaled rotating platform supporting a projectile having an inertial navigation system.

Figure 1:
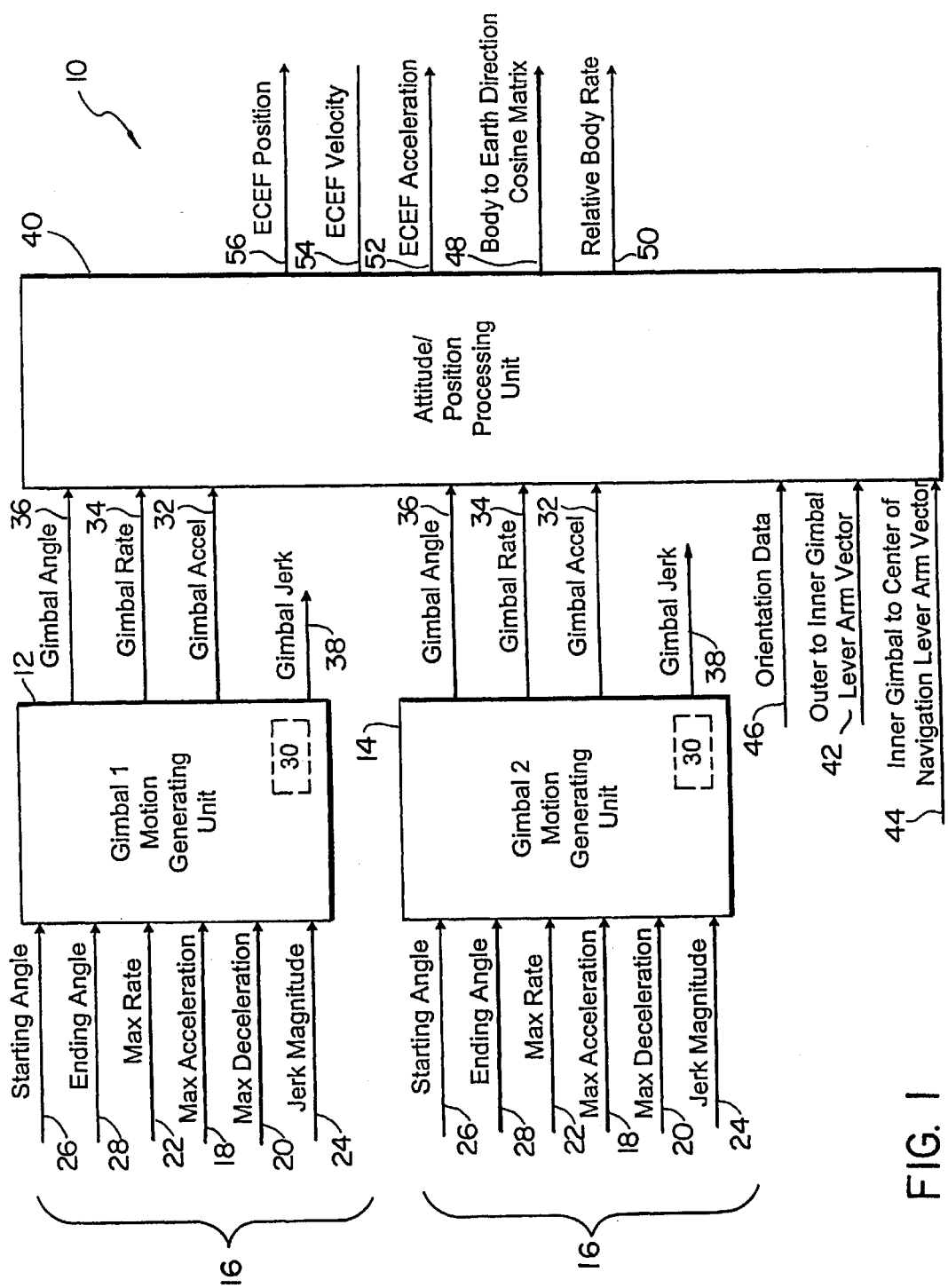
FIG. 1 is a functional block diagram of a motion and trajectory data generator for a multi-gimbaled rotating platform in accordance with a preferred embodiment of the present invention.

Referring now to FIG. 1, a functional block diagram of a system 10 embodying the principles of the present invention for generating motion and trajectory data for a multi-gimbaled rotating platform is illustrated. The system is preferably implemented as a software program executing in a computer, where the software is provided on a storage medium, such as RAM, ROM, CD-ROM, disk, or other computer medium, accessed by the computer. For the purposes of providing a non-limiting example, the system 10 is illustrated and will be described as having two gimbals defining two respective degrees of rotational freedom. It is understood that the teachings of the present invention can be extended to generate motion and trajectory data for a rotating platform having any number of gimbals. A gimbal is a rotary joint attachment between parts of a device that allows relative angular rotation of the parts about an axis. The gimbal may have a motor for commanding desired angular motions, a readout for measuring the relative angular position between the parts, or slip rings for transmitting electric power and data signals between the parts. A motion generating unit 12 is provided for generating a set of motion equations which define the rotational movement of the platform about the pivot axis of a first gimbal (not shown). In a preferred embodiment of the present invention, a second motion generating unit 14 is provided for generating a set of motion equations defining a second degree of rotational movement of the platform about the pivot axis of a second gimbal.

In order to generate motion data which accurately simulates the movement of a rotating platform, the starting and stopping characteristics of the motion of the platform must be accounted for in order to simulate realistic inertial data. Thus, movement characteristics 16 of the first gimbal are input into the motion generating unit 12, where the movement characteristics 16 include a maximum angular acceleration 18, a maximum angular deceleration 20, a maximum angular rate 22, a step angular jerk 24 of the first gimbal, a starting angle 26 representing the position of the gimbal at the beginning of its rotational movement, and an ending angle 28 representing the position of the gimbal at the end of its rotational movement. From these input values, the motion generating unit 12 generates a set of motion equations 30 which define the movement of the first gimbal between the starting angle 26 and the ending angle 28. The set of motion equations 30 define an angular acceleration 32, an angular rate 34, an angular displacement 36, and an angular jerk 38 for the first gimbal as a function of time through its movement.

Similarly, the motion generating unit 14 will receive a respective set of input values which define the movement characteristics, starting angle, and ending angle of the second gimbal. From these input values, the motion generating unit 14 generates a set of motion equations 30 which define the movement of the second gimbal between its starting and ending positions. Motion generating unit 14 operates identically to motion generating unit 12, where only the actual values defining the operation of the second gimbal will differ from the values defining the operation of the first gimbal. Therefore, a discussion of the operation of the second motion generating unit 14 will be omitted with an understanding that the second motion generating unit 14 for the second gimbal operates in a similar manner as the motion generating unit 12 for the first gimbal. Likewise, alternative embodiments of the present invention utilizing further gimbals would also include respective motion generating units which operate similarly. The specific manner in which the set of motion equations are generated by the motion generating unit 12 will be described in greater detail hereinafter.

Once the set of motion equations 30 for each gimbal of the multi-gimbal rotating platform are generated, it is possible to utilize these gimbal motion equations 30 to compute trajectory data for an object being supported by the platform, such as a guided projectile. As discussed above, it is common for guided projectiles to be launched from a launcher platform having several degrees of rotational freedom in order to position the projectile to a desired launch position. Typically, an inertial navigation system (INS) is incorporated into the projectile in order to guide the projectile to a desired target location. The rotation of the launcher platform can be used to align and calibrate the INS with respect to Earth in order to more accurately guide the projectile. The present invention utilizes the set of motion equations simulating movement of the rotating platform to generate trajectory data for the location of the INS with respect to Earth, so that the effect of the motion of the rotating platform on the INS can be simulated without requiring the rotating platform to be actually moved in a field test. While the description of the present invention will set forth its use in generating trajectory data for an INS positioned within a projectile being supported by the rotating platform, it is understood that trajectory data may be generated for any object being supported by the rotating platform.

As shown in the FIG. 1, the set of motion equations 30 defining the angular acceleration 32, angular rate 34, and angular displacement 36 for each gimbal are provided to an attitude/position processing unit 40. The set of motion equations 30 may define other aspects of motion, such as gimbal jerk 38, which are not input into the attitude/position processing unit 40 but can be utilized for other purposes. Since the INS on the rotating platform is actually located some distance from each of the gimbals themselves, it is necessary to provide information relating to lever arm vectors between the pivot axes of the gimbals as well as between the innermost gimbal pivot axis and the INS location in order to provide trajectory data for the INS with respect to Earth. Therefore, a lever arm vector 42 between the outer gimbal pivot axis and the inner gimbal pivot axis and a lever arm vector 44 between the inner gimbal pivot axis and the center of the INS location are input into the attitude/position processing unit 40. Furthermore, orientation data 46 is provided to the attitude/position processing unit 40 which defines the orientation of the object (i.e., projectile) with respect to the rotating platform. For instance, the orientation data 46 can indicate whether the projectile is right side up, upside down, or oriented at some angle with respect to the rotating platform.

From the information received, the attitude/position processing unit 40 generates a second set of motion equations which define the movement of the INS location on the rotating platform, wherein said second set of motion equations include a relative acceleration 52, velocity 54, and position 56 experienced at the INS location. This second set of equations may be expressed as vectors in the Earth Centered Earth Fixed (ECEF) coordinate system to provide a relative instantaneous position, velocity, and acceleration of the INS with respect to the Earth. However, it is understood that the ECEF is merely one possible reference coordinate system, where the attitude/position processing unit 40 may transform the second set of motion equations to other possible coordinate systems. From the input information, the attitude/position processing unit 40 further generates attitude information 48 and a relative body rate 50 of the INS relative to the Earth. The attitude information 48 is preferably represented in either a Direction Cosine Matrix or in Quaternion form in order to avoid any singularities which may occur in other common representations. The Body to Earth Direction Cosine Matrix 48 defines how the body of the INS is oriented with respect to the Earth coordinate system. The relative body rate 50 is the rate at which the two coordinate systems are moving relative to each other.

Figure 2:
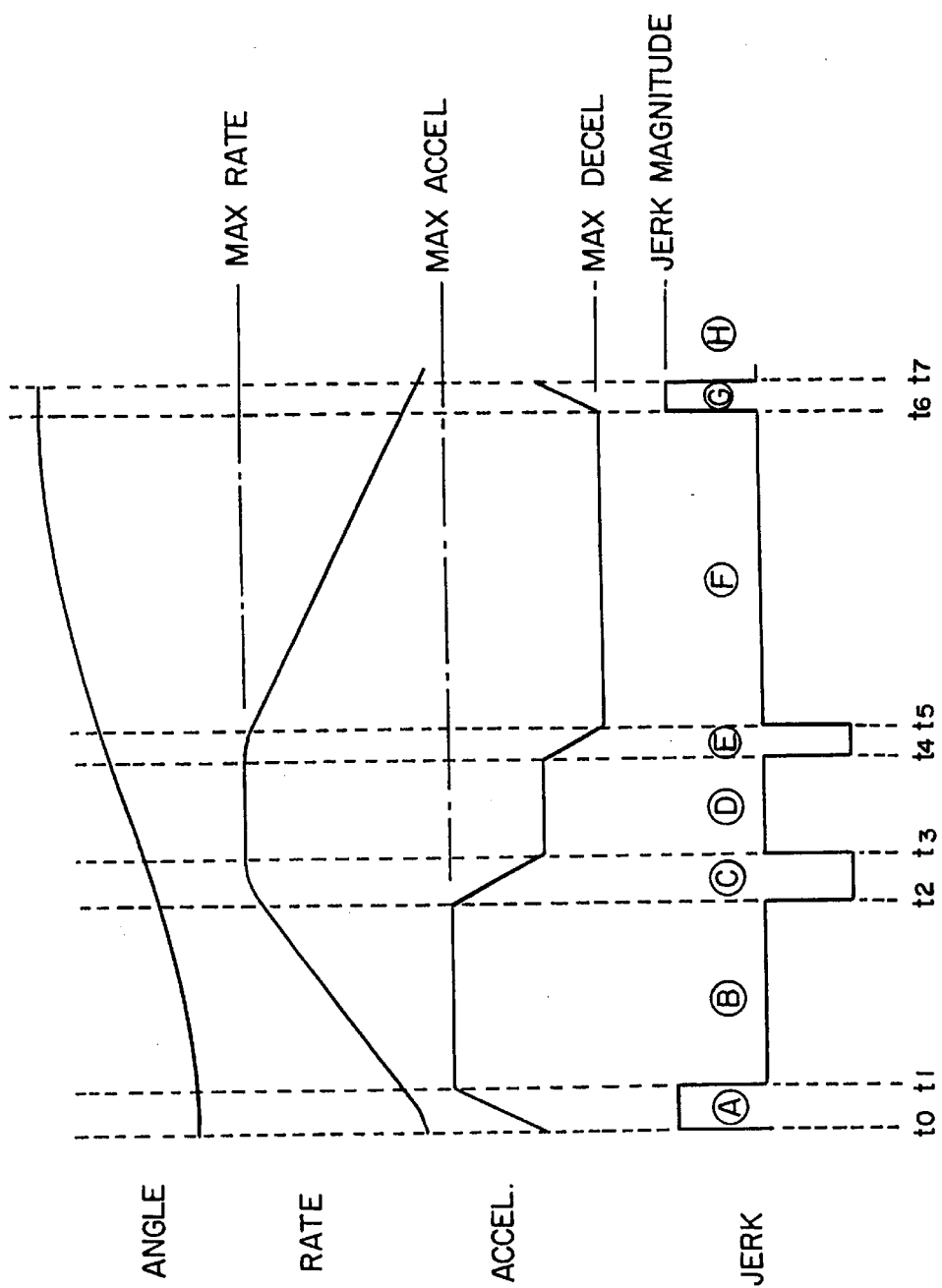
FIG. 2 is motion timeline exemplifying profiles of a set of motion equations as a function of time between the starting position and the ending position of a gimbal.

A preferred method in which the motion generating unit 12 generates the set of motion equations 30 for the rotational movement of the gimbal between starting and ending positions will now be described in greater detail. As the gimbal moves between the starting and ending angles, the gimbal will experience values of step angular jerk, angular acceleration, angular deceleration, and angular rate which all vary through the movement of the gimbal. A sample motion timeline is illustrated in FIG. 2, which shows a possible profile of a set of motions equations as a function of time between the starting position and the ending position of a gimbal. The motion timeline can be broken into seven different time regions, where the characteristics of the motion of the gimbal within each time region will respectively differ based upon how the gimbal is operating. Transition times (t0, t1, t2, t3, t4, t5, t6, t7) between the time regions which define the length of each time region are determined based upon the input movement characteristics of the gimbal and the input degree of movement. At transition time t0, an initial torque will be applied to move the gimbal from its starting position, resulting in the angular jerk and the ramping angular acceleration as shown in time region A. At transition time t1, the greatest amount of torque is being applied to the gimbal, where maximum acceleration of the gimbal is reached while the angular rate continues to build as shown in time region B. At transition time t2, the acceleration of the gimbal is slowed down as the gimbal approaches its maximum rate, as shown in time region C. At transition time t3, the gimbal is no longer accelerating as it has reached its maximum rate as shown in time region D. As the gimbal will eventually be required to stop, the gimbal begins to decelerate at transition time t4 which also decreases the angular rate as shown in time region E. Once the highest amount of torque to slow down the gimbal is being applied, the gimbal will reach maximum deceleration at transition time t5 which continues to decrease the angular rate as shown in time region F. At transition time t6, the gimbal will decrease its deceleration which lessens the degree in which the angular rate is decreasing as shown in time region G. At transition time t7, the gimbal has reached the desired ending angle and all values of rate, acceleration, and jerk should be at zero at this point.

As can be seen, due to the different operation characteristics of the gimbal within each of the time regions of the motion timeline, a different set of motion equations must be generated for the gimbal within each time region. Under normal operating conditions, it is assumed that the gimbal will achieve its maximum values of acceleration, deceleration, and rate during its movement through the motion timeline between starting and ending positions. The standard set of equations generated by the motion generating unit 12 are generated under this assumption that each of these maximum values are achieved. However, there will exist certain situations where it is not possible for the gimbal to achieve at least one of these maximum values when moving between starting and ending positions. Thus, the motion generating unit 12 of the present invention determines when a maximum value of one of the movement characteristics of the gimbal is not achieved and modifies the standard set of motion equations 30 accordingly.

Referring now to FIG. 3, an operational block diagram of a preferred method in which the motion generating unit 12 generates the set of motion equations 30 is illustrated. Initially, in step 300 the motion generating unit 12 receives the input movement characteristics 16, the starting angle 26, and the ending angle 28 of the gimbal. In step 302, the motion generating unit 12 determines the transition times between time periods for the input operating characteristics of the gimbal based upon the assumption that the gimbal achieves maximum acceleration, maximum deceleration, and maximum rate in its movement between the starting angle and the ending angle. The motion generating unit 12 then analyzes the transition times in step 304 to determine whether normal operation conditions are present (i.e., maximum acceleration, deceleration, and rate are achieved). When normal gimbal operating characteristics are achieved, a set of motion equations are generated in step 306 based upon a predetermined set of equations designed for normal operating conditions using the information received in step 300.

When normal operating conditions are not achieved, then at least one of the maximum acceleration, maximum deceleration, and maximum rate have not been achieved. In step 308, the motion generating unit 12 determines the operating condition of the gimbal by determining which of the maximum acceleration, maximum deceleration, and maximum rate have not been achieved. In step 310, the motion generating unit 12 modifies the predetermined set of equations designed for normal operation based upon the determined operating condition to account for whichever maximum values are not achieved. The modified set of equations are then utilized as the set of motion equations 30 for the motion of the gimbal between its starting and ending positions. Instead of separately developing a different set of equations for each of the possible gimbal operating conditions, the present invention has developed a standard predetermined set of equations based upon normal operating conditions where maximum values of acceleration, deceleration, and rate are achieved. If one or more of the maxima (acceleration, rate, deceleration) are not achieved for a particular case, the transition times are recalculated for the particular case and the actual maxima achieved are substituted into the predetermined set of equations for the expected maximum values.

Figure 4A:
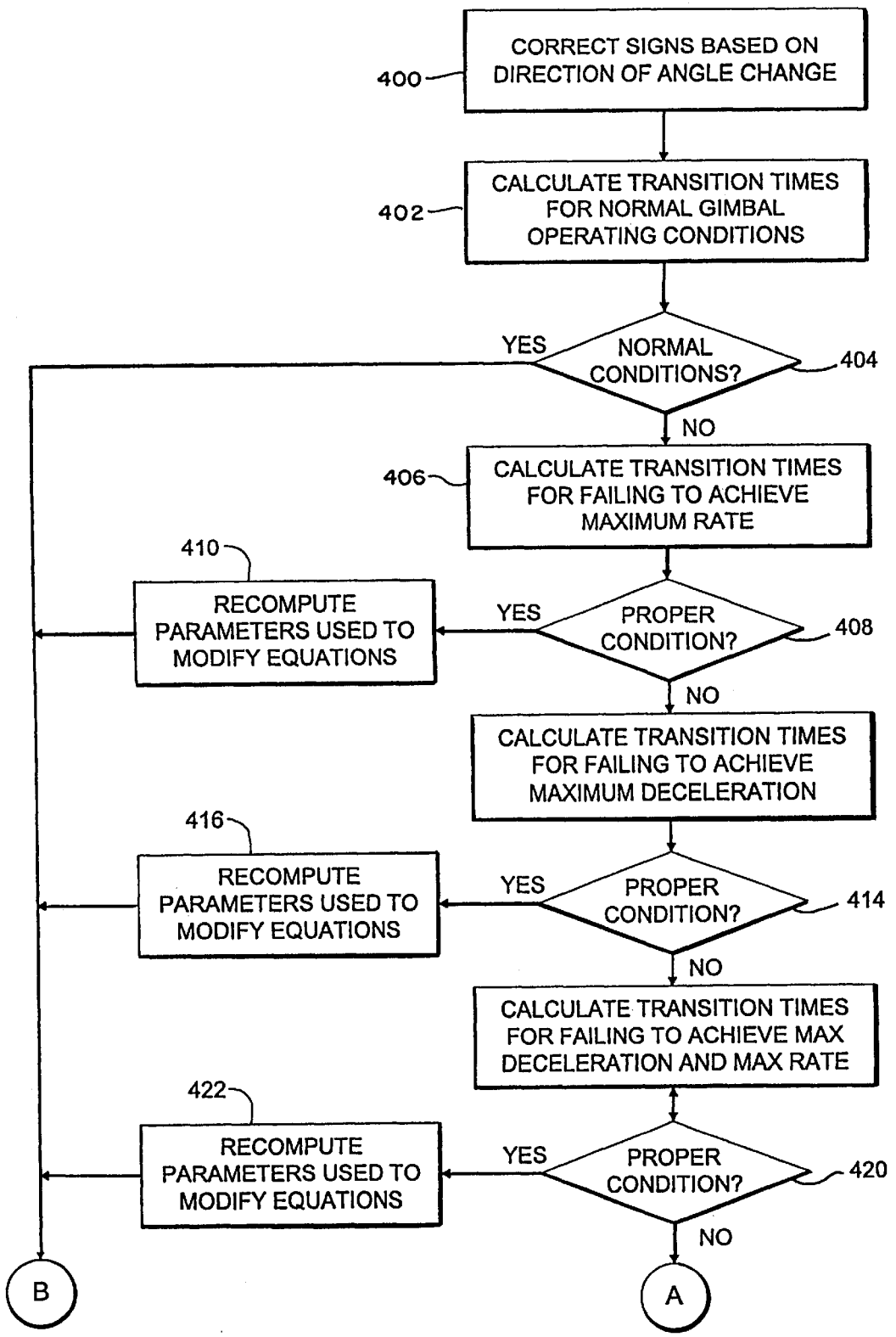

Referring now to FIGS. 4A and 4B, a more detailed method of a preferred embodiment in which the motion generating unit 12 determines the transition times between time periods and determines the actual operating condition of the gimbal is illustrated. Initially in step 400, the signs of the maximum rate, maximum acceleration, maximum deceleration, and jerk magnitude are corrected to account for the direction of angle change. In step 402, the transition times between time regions are calculated based on the assumption that normal gimbal operating conditions are present, wherein the transition times are calculated according to the following equations:

$$t_1 = \frac{\text{Max Accel}}{J}$$

$$t_2 = \frac{\text{Max Rate}}{\text{Max Accel}}$$

$$t_3 = t_1 + t_2$$

$$t_4 = \frac{(\text{End Angle} - \text{Start Angle})}{\text{Max Rate}} + 0.5 * \left[ t_3 + \frac{\text{Max Decel}}{J} + \frac{\text{Max Rate}}{\text{Max Decel}} \right]$$

$$t_5 = t_4 - \frac{\text{Max Decel}}{J}$$

$$t_6 = t_4 - \frac{\text{Max Rate}}{\text{Max Decel}}$$

$$t_7 = t_6 - \frac{\text{Max Decel}}{J}$$

After the transition times have been calculated, it is determined in step 404 whether the transition times satisfy the requirements for normal operating conditions by determining if the transition times satisfy the following conditions:

$t_2 > t_1$ & $t_4 > t_3$ & $t_6 > t_5$

If normal operating conditions are determined to be present, then the input gimbal movement characteristics are utilized when generating the set of motion equations 30. If normal operating conditions are not present, then the motion generating unit must determine the actual operating condition. In step 406, transition times are calculated based on the assumption that the gimbal fails to achieve maximum rate during the motion timeline between starting and ending positions. The computed transition times are then tested within step 408 to determine if the gimbal only fails to achieve maximum rate by determining if the transition times meet the following criteria:

$t_2 > t_1$ & $|\text{Max Accel}* t_2| < |\text{Max Rate}|$ & $t_6 > t_5$

If the gimbal only fails to achieve maximum rate, then the parameters for the maximum rate are recomputed and utilized in computing the set of motion equations, wherein the maximum rate is recomputed in step 410 according to the following equation:

$$\text{Max Rate} = \text{Max Accel} * t_2$$

If the proper operating condition has not yet been identified, the motion generating unit 12 next calculates the transition times in step 412 calculated based on the assumption that the gimbal fails to achieve maximum deceleration during the motion timeline between starting and ending positions. The computed transition times are then tested within step 414 to determine if the gimbal fails to achieve maximum deceleration by determining if the transition times meet the following criteria:

$t_2 > t_1$ & $t_4 > t_3$ & $|J * (t_5 - t_4)| < |\text{Max Decel}|$

If the gimbal is determined to only fail to achieve maximum deceleration, then the parameters for the maximum deceleration are recomputed and utilized in computing the set of motion equations, wherein the maximum deceleration is recomputed in step 416 according to the following equation:

$$\text{Max Decel} = -J * (t_5 - t_4)$$

If the proper operating condition has not yet been identified, the motion generating unit 12 next calculates the transition times in step 418 calculated based on the assumption that the gimbal fails to achieve both maximum deceleration and maximum rate during the motion timeline between starting and ending positions. The computed transition times are then tested within step 420 to determine if the gimbal fails to achieve both maximum deceleration and maximum rate by determining if the transition times meet the following criteria:

$t_2 > t_1$ & $|\text{Max Accel}* t_2| < |\text{Max Rate}|$ & $|J * (t_5 - t_3)| < |\text{Max Decel}|$ If the gimbal is determined to fail to achieve both maximum deceleration and maximum rate, then the parameters for the maximum deceleration and maximum rate are recomputed in step 422 and subsequently utilized in computing the set of motion equations according to the following equations:

$$\text{Max Rate} = \text{Max Accel} * t_2$$

$$\text{Max Decel} = -J * (t_5 - t_3)$$

With control continuing on as illustrated in FIG. 4B, if the proper operating condition has not been found to be present, the motion generating unit 12 next calculates the transition times in step 424 calculated based on the assumption that the gimbal fails to achieve maximum acceleration during the motion timeline between starting and ending positions. The computed transition times are then tested within step 426 to determine if the gimbal fails to achieve maximum acceleration by determining if the transition times meet the following criteria:

$|J * t_1| < |\text{Max Accel}|$ & $t_4 > t_3$ & $t_6 > t_5$

If the gimbal is determined to fail to achieve maximum acceleration, then the parameter for the maximum acceleration is recomputed in step 428 and subsequently utilized in computing the set of motion equations according to the following equation:

$$\text{Max Accel} = J * t_1$$

If the proper operating condition has not yet been identified, the motion generating unit 12 next calculates the transition times in step 430 calculated based on the assumption that the gimbal fails to achieve both maximum acceleration and maximum rate during the motion timeline between starting and ending positions. The computed transition times are then tested within step 432 to determine if the gimbal fails to achieve both maximum acceleration and maximum rate by determining if the transition times meet the following criteria:

$|\text{Jerk}*t_1| < |\text{Max Accel}|$ & $|J*t_1^2| < |\text{Max Rate}|$ & $t_6 > t_5$ & $t_1 > 0$ If the gimbal is determined to fail to achieve both maximum acceleration and maximum rate, then the parameters for the maximum acceleration and maximum rate are recomputed in step 434 and subsequently utilized in computing the set of motion equations according to the following equations:

$$\text{Max Accel} = J * t_1$$

$$\text{Max Rate} = \text{Max Accel} * t_1$$

If the proper operating condition has not yet been identified, the motion generating unit 12 next calculates the transition times in step 436 calculated based on the assumption that the gimbal fails to achieve both maximum acceleration and maximum deceleration during the motion timeline between starting and ending positions. The computed transition times are then tested within step 438 to determine if the gimbal fails to achieve both maximum acceleration and maximum deceleration by determining if the transition times meet the following criteria:

$$|J*t_1|<|Max\ Accel|\ \&\ t_4>t_3\ \&\ |J*(t_5-t_4)|<|Max\ Decel|$$

If the gimbal is determined to fail to achieve both maximum acceleration and maximum deceleration, then the parameters for the maximum acceleration and maximum deceleration are recomputed in step 440 and subsequently utilized in computing the set of motion equations according to the following equations:

$$Max\ Accel=J*t_1$$

$$Max\ Decel=-J*(t_5-t_4)$$

If the proper operating condition has not yet been identified, the motion generating unit 12 next calculates the transition times in step 442 calculated based on the assumption that the gimbal fails to each of the maximum acceleration, maximum deceleration, and maximum rate during the motion timeline between starting and ending positions. The computed transition times are then tested within step 444 to determine if the gimbal fails to achieve all three maximum by determining if the transition times meet the following criteria:

$$J*t_1|<|Max\ Accel|\ \&\ |J*t_1^2|<|Max\ Rate|\ \&\ |J*(t_5-t_3)|<|Max\ Decel|$$

If the gimbal is determined to fail to achieve all three maxima, then the parameters for the maximum acceleration, maximum deceleration, and maximum rate are recomputed in step 446 and subsequently utilized in computing the set of motion equations according to the following equations:

$$Max\ Accel=J*t_1$$

$$Max\ Rate=J*t_1^2$$

$$Max\ Decel=-J*(t_5-t_3)$$

If the operating conditions of the gimbal fails to satisfy any of the test conditions, then it is determined that an error condition is present in step 448, such as invalid data being provided to the motion generating unit. It is understood that the specific order in which the above-described operating conditions are determined is not critical to the operation of the present invention.

Once the motion generating unit 12 determines the proper operating condition and calculates the parameters to be utilized in the set of motion conditions for the determined operating condition, the motion generating unit 12 then generates the set of motion equations 30 for each of the time periods in accordance with a preferred method of the present invention illustrated as an operational block diagram in FIG. 5. In step 500, if the time t<0, then the gimbal should be stationary and the initial settings for the set of motion equations should be set in step 502 to equal the following:

ANGLE=Start Angle

Rate=0

Accel=0

Jerk=0

When it is determined that t is in time region A ($0 \leq t < t1$) in step 504, then jerk is applied to the gimbal to start acceleration and to start rate in step 506 according to the following equations:

$$Angle = Start\ Angle + \left[\frac{1}{6} * J * t^3\right]$$

$$Rate = 0.5 * J * t^2$$

$$Accel = J * t$$

$$Jerk = J$$

When it is determined that t is in time region B ($t1 \leq t < t2$) in step 508, then maximum acceleration has been reached and rate continues to increases in step 510 according to the following equations:

$$Angle = Start\ Angle +$$
$$\left[0.5 * Max\ Accel * (t-t_1)^2] + [0.5 * J * t_1^2 * (t-t_1)] + \left[\frac{1}{6} * J * t_1^3\right]\right]$$

$$Rate = [Max\ Accel*(t-t_1)] + [0.5*J*t_1^2]$$

$$Accel = Max\ Accel$$

$$Jerk = 0$$

When it is determined that t is in time region C ($t2 \leq t < t3$) in step 512, then jerk is applied to decrease acceleration while still continuing to increase rate in step 514 according to the following equations:

$$Angle = Start\ Angle +$$
$$\left[0.5 * Max\ Accel * (t-t_1)^2] + \left[\frac{1}{6} * J * (t_1^3 - (t-t_2)^3 + (3 * t_1^2 * (t-t_1)))\right]\right]$$

$$Rate = [Max\ Accel*(t-t_1)] + [0.5*J*(t_1^2-(t-t_2)^2)]$$

$$Accel = Max\ Accel - [J*(t-t_2)]$$

$$Jerk = -J$$

When it is determined that t is in time region D ($t3 \leq t < t4$) in step 516, then maximum rate has been reached and angle continues to increase in step 518 according to the following equations:

$$Angle = Start\ Angle + [Max\ Rate*(t-t_3)] + [0.5*Max\ Accel*t_2^2] + [0.5*J*t_1^2*t_2]$$

$$Rate = Max\ Rate$$

$$Accel = 0$$

$$Jerk = 0$$

When it is determined that t is in time region E ($t4 \leq t < t5$) in step 520, then jerk is applied to the gimbal to start decelerating and to decrease rate in step 522 according to the following equations:

$$\text{Angle} = \text{Start Angle} + [\text{Max Rate} * (t - t_3)] + \left[0.5 * \text{Max Accel} * t_2^2\right] + \frac{1}{6} * J * [3 * t_1^2 * t_2 - (t - t_4)^3]$$

$$\text{Rate} = \text{Max Rate} - [0.5 * J * (t - t_4)^2]$$

$$\text{Accel} = -J * (t - t_4)$$

$$\text{Jerk} = -J$$

When it is determined that t is in time region F ($t5 \leq t < t6$) in step 524, then maximum deceleration has been reached and rate continues to decrease in step 526 according to the following equations:

$$\text{Angle} = \text{Start Angle} + [\text{Max Rate} * (t-t_3)] + 0.5 * [(\text{Max Accel} * t_2^2) + (\text{Max Decel} * (t-t_5)^2)] + 1/6 * J * [(3 * t_1^2 * t_2) - (t_5-t_4)^3 - (3 * (t_5-t_4)^2 * (t-t_5))]$$

$$\text{Rate} = \text{Max Rate} + [\text{Max Decel} * (t-t_5)] - [0.5 * J * (t_5-t_4)^2]$$

$$\text{Accel} = \text{Max Decel}$$

$$\text{Jerk} = 0$$

When it is determined that t is in time region G ($t6 \leq t < t7$) in step 528, then jerk is applied to the gimbal to decrease deceleration while continuing to decrease rate in step 530 according to the following equations:

$$\text{Angle} = \text{Start Angle} + [\text{Max Rate} * (t-t_3)] + 0.5 * [(\text{Max Accel} * t_2^2) + (\text{Max Decel} * (t-t_5)^2)] + 1/6 * J * [(3 * t_1^2 * t_2) - (t_5-t_4)^3 + (t-t_6) - (3*(t_5-t_4)^2*(t-t_5))]$$

$$\text{Rate} = \text{Max Rate} + [\text{Max Decel} * (t-t_5)] + [0.5 * J * ((t-t_6)^2 - (t_5-t_4)^2)]$$

$$\text{Accel} = \text{Max Decel} + [J * (t-t_6)]$$

$$\text{Jerk} = J$$

After $t \geq t7$, the gimbal has reached the ending position and all of the final settings should be set equal to zero in step 532 according to the following equations:

$$\text{Angle} = \text{Ending Angle}$$

$$\text{Rate} = 0$$

$$\text{Accel} = 0$$

$$\text{Jerk} = 0$$

From the set of motion equations 30 generated by the motion generating units 12 and 14, the attitude/position processing unit 40 generates a second set of motion equations for the location of the INS in the object being supported by the rotating platform. As discussed above, the set of motion equations for the INS include a relative acceleration 52, velocity 54, and position 56 experienced at the location of the INS on the platform as well as attitude information 48 and a relative body rate 50 of the INS relative to the Earth. In order to provide a non-limiting example of how the attitude/position processing unit 40 generates the set of motion equations for the INS, the following example will set forth the equations generated for a rotating platform having two gimbals, an elevation gimbal and an azimuth gimbal. The equations set forth are merely intended to illustrate an exemplifying manner in which the attitude/position processing unit 40 generates a set of motion equations for an INS being supported on a platform rotating about an elevation gimbal and an azimuth gimbal, where these equations are not intended to represent the specific set of motion equations which may be generated for other possible embodiments of the present invention.

Initially, the set of motion equations 30 from the motion generating units for the elevation gimbal and the azimuth gimbal are transformed into an appropriate frame coordinate system, as defined by the following expressions:

$C_t^{\,l}$=turret frame to launcher frame direction cosine matrix, which is a direction cosine matrix that is computed from the gimbal angle 36 of the azimuth gimbal.

$C_c^{\,t}$=cage frame to turret frame direction cosine matrix, which is direction cosine matrix computed from the gimbal angle 36 of the elevation gimbal.

$\omega_{el}^{(c)}$=angular rate 34 of the elevation gimbal in the cage frame expressed as an angular rate vector.

$\omega_{az}^{(t)}$=angular rate 34 of the azimuth gimbal in the turret frame expressed as an angular rate vector.

$\dot{\omega}_{el}^{(c)}$=angular acceleration 32 of the elevation gimbal in cage frame expressed as an angular acceleration vector.

$\dot{\omega}_{az}^{(t)}$=angular acceleration 32 of the azimuth gimbal in the turret frame expressed as an angular acceleration vector.

The lever arm vectors received by the attitude/position processing unit 40 can be defined by the following expressions:

$\underline{R}_2^{(c)}$=elevation gimbal pivot axis to center of navigation vector in cage frame (lever arm vector 44).

$\underline{R}_4^{(t)}$=azimuth gimbal pivot axis to elevation gimbal pivot axis vector in turret frame (lever arm vector 42).

Furthermore, the orientation data 46 provided to the attitude/position processing unit 40 can be represented by the following expressions:

$C_c^b$ = cage frame to body frame direction cosine matrix, which is equal to $\begin{bmatrix} 1 & 0 & 0 \\ 0 & 1 & 0 \\ 0 & 0 & 1 \end{bmatrix}$ if not upside down or $\begin{bmatrix} 1 & 0 & 0 \\ 0 & -1 & 0 \\ 0 & 0 & -1 \end{bmatrix}$ if upside down.

$C_1^{\,n}$=launcher frame to navigation frame direction cosine matrix, which is computed from pitch, roll & heading of the rotating platform, this is the orientation of the rotating platform relative to the navigation frame.

$C_n^{\,e}$=navigation frame to earth frame direction cosine matrix, which is computed from Latitude & Longitude obtained from the past value of ECEF Position, this is the orientation of the navigation frame relative to Earth.

From these defined parameters, the attitude/position processing unit 40 generates the following set of motion equations for the INS:

$$\text{ECEF Position} = Az\ \text{Pivot} ECEF\ \text{Position} + \underline{R}_6^{(e)} \qquad (56)$$

$$\text{ECEF Velocity} = C_t^{\,e}(\underline{V}_{az}^{(t)} + \underline{V}_{el}^{(t)}) \qquad (54)$$

ECEF Acceleration=$C_t{}^e[(\underline{\omega}_{az}{}^{(t)} \times \underline{V}_{az}{}^{(t)}) +$ $((\underline{\omega}_{az}{}^{(t)} + \underline{\omega}_{az}{}^{(t)} + \underline{\omega}_{el}{}^{(t)}) \times \underline{V}_{el}{}^{(t)}) +$ $(\underline{\dot{\omega}}_{az}{}^{(t)} \times \underline{R}_6{}^{(t)}) + (\underline{\dot{\omega}}_{el}{}^{(t)} \times$ $\underline{R}_2{}^{(t)})]$ (52)

Body to Earth Direction Cosine Matrix $(C_b{}^e) = C_t{}^e C_c{}^t (C_c{}^b)^T$ (48)

Relative Body Rate $(\underline{\omega}_{be}{}^{(b)}) = C_c{}^b[(C_c{}^t)^T \underline{\omega}_{az}$ $(t) + \underline{\omega}_{el}{}^{(c)}]$ (50)

where, $C_t{}^e = C_n{}^e C_1{}^n C_t{}^1$
$\underline{R}_2{}^{(t)} = C_c{}^t \underline{R}_2{}^{(c)}$
$\underline{R}_6{}^{(t)} = \underline{R}_4{}^{(t)} + \underline{R}_2{}^{(t)}$
$\underline{R}_6{}^{(e)} = C_t{}^e \underline{R}_6{}^{(t)}$
$\underline{\omega}_{el}{}^{(t)} = C_c{}^t \underline{\omega}_{el}{}^{(c)}$
$\underline{\dot{\omega}}_{el}{}^{(t)} = C_c{}^t \underline{\dot{\omega}}_{el}{}^{(c)}$
$\underline{V}_{az}{}^{(t)} = \underline{\omega}_{az}{}^{(t)} \times \underline{R}_6{}^{(t)}$
$\underline{V}_{el}{}^{(t)} = \underline{\omega}_{el}{}^{(t)} \times \underline{R}_2{}^{(t)}$ AzPivot ECEF Position=the position of the Azimuth Gimbal in earth frame.

From these equations, the attitude/position processing unit 40 provides motion and trajectory data simulating movement of the rotating platform to generate trajectory data for the location of the INS with respect to Earth, so that the effect of the motion of the rotating platform on the INS can be simulated without requiring the rotating platform to be actually moved in a field test. By utilizing the lever arms described through the specification, the present invention is able to more accurately describe the position of the INS as compared to standard implementations that use sampled angular rates and accelerations to determine sampled linear accelerations that are double-integrated to yield position.

The motion and trajectory data output by the attitude/position processing unit 40 generates a profile that further can be seamlessly integrated with the outputs of other motion generators. For instance, the output motion and trajectory data can be integrated with a flight profile generator to provide a complete profile of a projectile starting with the beginning position of the rotating platform, covering the motion of the platform toward the launch position for the projectile, and ending with the actual launch information for the projectile from the ending position of the platform. This is accomplished by setting the motion simulator end conditions of the present invention to the start conditions of the other motion generator, where the motion simulator of the present invention is run backwards through the desired motion. The data is then processed to generate a file that exactly represents the forward motion that culminates at the end condition. In this manner, the complete motion of a launch can be simulated taking into account the effects of the motion of a launch platform launch. The motion and trajectory data generated by the present invention may further be pre-corrected to compensate for discrete sampling.

As can be seen from the foregoing, the motion and trajectory data generator of the present invention provides simulated data for the movement of a launch platform carrying a projectile to be launched to permit evaluation of the projectile launch without actual field testing. Moreover, the motion and trajectory data generator of the present invention provides simulated data for a multi-gimbaled rotating launch platform.

In each of the above embodiments, the different structures of the motion and trajectory data generator for a multi-gimbaled rotating platform of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of generating motion data for a gimbal which rotates about a gimbal pivot axis, comprising:
   receiving movement characteristics of each gimbal; and
   generating a set of motion equations for each gimbal,
   wherein the movement of said gimbal can be represented by a timeline which is divided into a plurality of time regions, said method further generating a different set of respective motion equations for each time region.

2. The method of claim 1, wherein said set of motion equations define movement of the gimbal between a starting position comprising a starting angle of the gimbal and an ending position comprising an ending angle of the gimbal.

3. The method of claim 1, further comprising computing transition times between each of the plurality of time regions based upon the movement of the gimbal.

4. The method of claim 3, wherein seven transition times are computed to define the time regions.

5. The method of claim 3, wherein the transition times are computed based upon a maximum acceleration, a maximum deceleration, and a maximum angular rate achieved by the gimbal during movement between a starting position and an ending position.

6. The method of claim 1, further comprising generating a base set of motion equations based upon the gimbal achieving maximum acceleration, maximum deceleration, and maximum angular rate during movement between a starting position and an ending position.

7. The method of claim 6, further comprising modifying said base set of motion equations when it is determined that the gimbal fails to achieve at least one of maximum acceleration, maximum deceleration, and maximum angular rate during movement between the starting position and the ending position.

8. The method of claim 7, further comprising modifying the value within said base set of motion equations which is determined to fail to reach its maximum value during gimbal movement between the starting position and the ending position.

9. A method of generating motion data for a gimbal which rotates about a gimbal pivot axis, comprising:
   receiving movement characteristics of each gimbal;
   generating a set of motion equations for each gimbal,
   wherein said gimbal provides a degree of angular rotation for a platform, said method further comprising computing a set of object motion equations for an object being supported by the platform using said set of motion of equations for said gimbal, and
   wherein said set of object motion equations defines an attitude and a relative body rate of the object.

10. The method of claim 9, wherein said set of object motion equations defines at least one of an acceleration, a velocity, and a position of the object on the platform, and further comprising computing a relative instantaneous position of the object with respect to a pivot axis of the gimbal.

11. The method of claim 10, further comprising differentiating the relative instantaneous position to compute the velocity and the acceleration experienced by the object.

12. The method of claim 9, wherein lever arm vector information between the gimbal and the object is utilized in computing said set of object motion equations.

13. The method of claim 12, wherein multiple gimbals are provided and a respective set of motion equations is generated for each gimbal, wherein the generated set of motion equations for each gimbal is utilized in computing said set of object motion equations, further wherein the lever arm vector information comprises:
   a first lever arm vector between a pivot axis of an innermost gimbal and the object; and
   a second lever arm vector between the pivot axes of two gimbals.

14. The method of claim 13, comprising transforming the first and second lever arm vectors into Earth referenced vectors through a gimbal attitude transformation.

15. The method of claim 9, further comprising linking said set of object motion equations with data from other motion generators for the object in order to link the generated motion of the object on the platform with other motion of the object.

16. The method of claim 9, wherein said set of object motion equations are computed for a location of an inertial navigation system positioned within a projectile being supported by the platform.

17. The method of claim 9, further comprising pre-correcting said second set of motion equations to compensate for discrete sampling.

18. A method of generating motion data for a gimbal which rotates about a gimbal pivot axis, comprising:
   receiving movement characteristics of the gimbal; and
   generating a set of motion equations for said gimbal which define the movement of the gimbal,
   wherein the movement of said gimbal can be represented by a timeline which is divided into a plurality of time regions, wherein a different set of motion equations are respectively generated for each time region.

19. The method of claim 18, further comprising computing transition times between each of the plurality of time regions based upon the movement of the gimbal.

20. The method of claim 19, wherein seven transition times are computed to define the time regions.

21. The method of claim 19, wherein the transition times are computed based upon a maximum acceleration, a maximum deceleration, and a maximum angular rate achieved by the gimbal.

22. The method of claim 18, wherein a base set of motion equations is generated based upon the presumption that said gimbal achieves maximum acceleration, maximum deceleration, and maximum angular rate during movement between a starting position and an ending position.

23. The method of claim 22, further comprising modifying said base set of motion equations when it is determined that the gimbal fails to achieve at least one of maximum acceleration, maximum deceleration, and maximum angular rate during movement between the starting position and the ending position.

24. The method of claim 23, further comprising modifying the value within said base set of motion equations which is determined to fail to reach its maximum value during gimbal movement between the starting position and the ending position.

25. The method of claim 18, wherein said set of motion equations defines movement of the gimbal from a starting position comprising a starting angle of the gimbal and an ending position comprising an ending angle of the gimbal.

26. The method of claim 18, wherein said gimbal movement characteristics include at least one of a starting position, an ending position, a maximum angular acceleration, a maximum angular deceleration, maximum angular rate, and a step angular jerk magnitude.

27. The method of claim 18, wherein said set of motion equations defines at least one of an angular jerk, an angular acceleration, an angular rate, and an angular displacement of the gimbal as a function of time.

28. The method of claim 18, further comprising pre-correcting said set of motion equations to compensate for discrete sampling.

29. A method of generating motion data and trajectory data for an object on a rotatable platform. wherein said platform possesses at least one degree of angular rotation with each degree of angular rotation provided about a pivot axis of a respective gimbal, comprising:
   receiving motion data for each gimbal defining movement of the gimbal;
   computing a set of object motion equations for an object being supported by the platform using said motion data for said gimbal,
   wherein said set of object motion equations define at least one of an acceleration, a velocity, and a position of the object on the platform; and
   computing a relative instantaneous position of said object with respect to a pivot axis of a gimbal.

30. The method of claim 29, further comprising differentiating the relative instantaneous position to compute the velocity and the acceleration experienced by the object.

31. The method of claim 29, wherein said set of object motion equations define at least one of an attitude and a relative body rate of the object.

32. The method of claim 29, wherein lever arm vector information between a gimbal and the object is utilized in computing said set of object motion equations.

33. The method of claim 32, wherein the platform includes multiple gimbals with a respective motion data being received for each gimbal, further wherein the lever arm vector information comprises:
   a first lever arm vector between a pivot axis of an innermost gimbal and the object; and
   a second lever arm vector between the pivot axes of two gimbals.

34. The method of claim 33, further comprising transforming the first and second lever arm vectors into Earth referenced vectors through a gimbal attitude transformation.

35. The method of claim 29, further comprising linking said set of object motion equations with data from another motion generator for the object in order to link the generated motion of the object on the platform with another motion of the object.

36. The method of claim 29, wherein said set of object motion equations are computed for a location of an inertial navigation system positioned within a projectile being supported by the platform.

37. The method of claim 29, further comprising pre-correcting said set of object motion equations to compensate for discrete sampling.

38. A method of generating motion data and trajectory data for an object on a rotatable platform, wherein said platform possesses at least one degree of angular rotation with each degree of angular rotation provided about a pivot axis of a respective gimbal, comprising:

receiving movement characteristics of each gimbal;

generating a set of motion equations for each gimbal defining the movement of the gimbal; and computing a set of object motion equations for an object being supported by the platform using the generated set of motion equations, wherein the movement of each gimbal can be represented by a timeline which is divided into a plurality of time regions, wherein a different set of motion equations are respectively generated for each time region.

39. The method of claim 38, further comprising computing transition times between each of the plurality of time regions based upon the movement of the gimbal.

40. The method of claims 39, wherein seven transition times are computed to define the time regions.

41. The method of claim 39, wherein the transition times are computed based upon a maximum acceleration, a maximum deceleration, and a maximum angular rate achieved by the gimbal.

42. A method of generating motion data and trajectory data for an object on a rotatable platform, wherein said platform possesses at least one degree of angular rotation with each degree of angular rotation provided about a pivot axis of a respective gimbal, comprising:

receiving movement characteristics of each gimbal;

generating a set of motion equations for each gimbal defining the movement of the gimbal; and computing a set of object motion equations for an object being supported by the platform using the generated set of motion equations, wherein a base set of motion equations is generated based upon the presumption that said gimbal achieves maximum acceleration, maximum deceleration, and maximum angular rate during movement between a starting position and an ending position.

43. The method of claim 42, further comprising modifying said base set of motion equations when it is determined that the gimbal fails to achieve at least one of maximum acceleration, maximum deceleration, and maximum angular rate during movement between the starting position and the ending position.

44. The method of claim 43, further comprising modifying the value within said base set of motion equations which is determined to fail to reach its maximum value during gimbal movement between the starting position and the ending position.

45. The method of claim 42, wherein said motion data defines movement of the gimbal between a starting position comprising a starting angle of the gimbal and an ending position comprising an ending angle of the gimbal.

46. A method of generating motion data and trajectory data for an object on a rotatable platform, wherein said platform possesses at least one degree of angular rotation with each degree of angular rotation provided about a pivot axis of a respective gimbal, comprising:

receiving movement characteristics of each gimbal;

generating a set of motion equations for each gimbal defining the movement of the gimbal, wherein said set of object motion equations define at least one of an acceleration, a velocity, and a position of the object on the platform;

computing a set of object motion equations for an object being supported by the platform using the generated set of motion equations; and computing a relative instantaneous position of said object with respect to a pivot axis of the gimbal.

47. The method of claim 46, further comprising differentiating the relative instantaneous position to compute the velocity and the acceleration experienced by the object.

48. The method of claim 46, wherein said set of object motion equations define at least one of an attitude and a relative body rate of the object.

49. The method of claim 46, wherein lever arm vector information between the gimbal and the object is utilized in computing said set of object motion equations.

50. The method of claim 49, wherein multiple gimbals are provided and a respective set of motion equations is generated for each gimbal, wherein the generated set of motion equations for each gimbal is utilized in computing said set of object motion equations, further wherein the lever arm vector information comprises:

a first lever arm vector between a pivot axis of an innermost gimbal and the object; and a second lever arm vector between the pivot axes of two gimbals.

51. The method of claim 50, further comprising transforming the first and second lever arm vectors into Earth referenced vectors through a gimbal attitude transformation.

52. The method of claim 46, further comprising linking said set of object motion equations with data from another motion generator for the object in order to link the generated motion of the object on the platform with another motion of the object.

53. The method of claim 46, wherein said set of object motion equations are computed for a location of an inertial navigation system positioned within a projectile being supported by the platform.

54. The method of claim 46, further comprising pre-correcting said set of object motion equations to compensate for discrete sampling.

55. A method of generating motion data and trajectory data for an object launched from a rotatable platform, wherein said platform possesses at least one degree of angular rotation with each degree of angular rotation provided about a pivot axis of a respective gimbal, comprising:

receiving motion data for each gimbal defining the movement of the gimbal;

receiving trajectory data representing a profile of the object away from the platform;

computing a set of object motion equations for an object being supported by the platform based said received motion data and said received trajectory data; and linking the set of object motion equations with said received trajectory data to link the motion of the object on the platform with motion of the object away from the platform.

56. The method of claim 55, wherein the trajectory data for the object will have a start condition and the set of object motion equations will have an end condition, the method further comprising matching the start condition of the trajectory data with the end condition of the set of object motion equations.

57. The method of claim 56, wherein the set of object motion equations are computed by working backwards from the matched end condition toward a start condition for the set of object motion equations.

58. The method of claim 55, wherein the movement of each gimbal can be represented by a timeline which is divided into a plurality of time regions, wherein a different set of motion equations are respectively generated for each time region.

59. The method of claim 58, further comprising computing transition times between each of the plurality of time regions based upon the movement of the gimbal.

60. The method of claim 59, wherein seven transition times are computed to define the time regions.

61. The method of claim 59, wherein the transition times are computed based upon a maximum acceleration, a maximum deceleration, and a maximum angular rate achieved by the gimbal during movement between a starting position and an ending position.

62. The method of claim 55, wherein a base set of motion equations is generated based upon the presumption that said gimbal achieves maximum acceleration, maximum deceleration, and maximum angular rate during movement between a starting position and an ending position.

63. The method of claim 62, further comprising modifying said base set of motion equations when it is determined that the gimbal fails to achieve at least one of maximum acceleration, maximum deceleration, and maximum angular rate during movement between the starting position and the ending position.

64. The method of claim 63, comprising modifying the value within said base set of motion equations which is determined to fail to reach its maximum value during gimbal movement between the starting position and the ending position.

65. The method of claim 55, wherein said motion data defines movement of the gimbal between a starting position comprising a starting angle of the gimbal and an ending position comprising an ending angle of the gimbal.

66. The method of claim 55, wherein said gimbal movement characteristics include at least one of a starting position, an ending position, a maximum angular acceleration, a maximum angular deceleration, maximum angular rate, and a step angular jerk magnitude.

67. The method of claim 55, wherein said set of motion equations defines at least one of an angular jerk, an angular acceleration, an angular rate, and an angular displacement of the gimbal as a function of time.

68. The method of claim 55, wherein said set of object motion equations define at least one of an acceleration, a velocity, and a position of the object on the platform.

69. The method of claim 68, further comprising computing a relative instantaneous position of said object with respect to a pivot axis of the gimbal.

70. The method of claim 69, further comprising differentiating the relative instantaneous position to compute the velocity and the acceleration experienced by the object.

71. The method of claim 55, wherein said set of object motion equations define at least one of an attitude and a relative body rate of the object.

72. The method of claim 55, wherein lever arm vector information between the gimbal and the object is utilized in computing said set of object motion equations.

73. The method of claim 72, wherein multiple gimbals are provided and a respective set of motion equations is generated for each gimbal, wherein the generated set of motion equations for each gimbal is utilized in computing said set of object motion equations, further wherein the lever arm vector information comprises:

a first lever arm vector between a pivot axis of an innermost gimbal and the object; and a second lever arm vector between the pivot axes of two gimbals.

74. The method of claim 73, further comprising transforming the first and second lever arm vectors into Earth referenced vectors through a gimbal attitude transformation.

75. The method of claim 55, wherein said set of object motion equations are computed for a location of an inertial navigation system positioned within a projectile being supported by the platform.

76. The method of claim 55, further comprising pre-correcting said set of object motion equations to compensate for discrete sampling.

* * * * *

UNITED STATES PATENT AND TRADEMARK OFFICE
CERTIFICATE OF CORRECTION

PATENT NO. : 6,687,645 B2
DATED : February 3, 2004
INVENTOR(S) : Randall K. Curey and Daniel A. Tazartes It is certified that error appears in the above-identified patent and that said Letters Patent is hereby corrected as shown below:

<u>Title page,</u>
Item [75], Inventors, correct the spelling of the inventor's name from "Tazarles" to -- Tazartes --.

Signed and Sealed this

Thirtieth Day of March, 2004

JON W. DUDAS
*Acting Director of the United States Patent and Trademark Office*